(12) United States Patent
Burk et al.

(10) Patent No.: US 10,227,182 B2
(45) Date of Patent: Mar. 12, 2019

(54) MOVEMENT DEVICE

(71) Applicant: WEBER MASCHINENBAU GMBH BREIDENBACH, Breidenbach (DE)

(72) Inventors: Alexander Burk, Dautphetal (DE); Christoph Eckhardt, Breidenbach (DE); Jochen Gerlach, Dautphetal (DE); Marco Nichau, Bad Laasphe (DE); Thomas Nispel, Dautphetal (DE); Ingo Rother, Breidenbach (DE); Leopold Von Keudell, Salem (DE); Steffen Zecher, Staufenberg (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 0 days.

(21) Appl. No.: 15/535,042

(22) PCT Filed: Dec. 15, 2015

(86) PCT No.: PCT/EP2015/079791
§ 371 (c)(1),
(2) Date: Jun. 10, 2017

(87) PCT Pub. No.: WO2016/096856
PCT Pub. Date: Jun. 23, 2016

(65) Prior Publication Data
US 2017/0334662 A1 Nov. 23, 2017

(30) Foreign Application Priority Data
Dec. 18, 2014 (DE) .................. 10 2014 119 110

(51) Int. Cl.
*B65G 35/06* (2006.01)
*B65G 54/02* (2006.01)
(Continued)

(52) U.S. Cl.
CPC .............. *B65G 47/38* (2013.01); *B26D 7/32* (2013.01); *B65G 54/02* (2013.01)

(58) Field of Classification Search
CPC ........... B65G 35/06; B65G 54/02; B26D 7/32
(Continued)

(56) References Cited

U.S. PATENT DOCUMENTS 4,766,993 A * 8/1988 Kita ...................... B61B 13/08
104/165
4,773,811 A 9/1988 Wasner
(Continued)

FOREIGN PATENT DOCUMENTS

DE 3136934 A1 3/1983
DE 3711688 A1 10/1988
(Continued)

OTHER PUBLICATIONS

German Search Report; International Search Report dated Sep. 9, 2015; International Preliminary Report on Patentability, 2 pages.
(Continued)

Primary Examiner — Douglas A Hess
(74) Attorney, Agent, or Firm — Cantor Colburn

(57) ABSTRACT

The invention relates to a device for moving objects, comprising a plurality of individually movable transport movers for transporting the objects, comprising a track system for the transport movers, said transport movers being movable in a transport direction along at least one specified track in said track system, and comprising a controller for controlling the movements of the transport movers in the track system. Each of the transport movers comprises at least one slide which interacts with the track system and at least one object support attached to the slide. The support is at least
(Continued)

Figure 1:
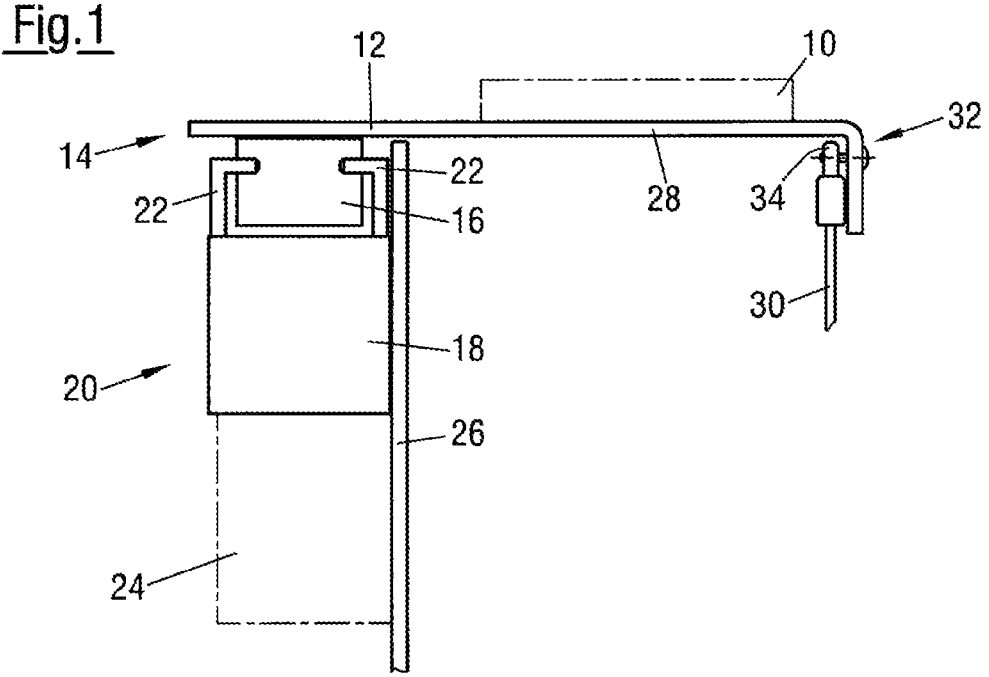

temporarily arranged in a protruding position in which at least an object receiving region of the support protrudes laterally.

24 Claims, 10 Drawing Sheets

(51) Int. Cl.
  *B26D 7/32* (2006.01)
  *B65G 47/38* (2006.01)
(58) Field of Classification Search
  USPC .................. 198/370.01, 370.03, 370.13
  See application file for complete search history.

(56) References Cited

U.S. PATENT DOCUMENTS

| | | | |
|---|---|---|---|
| 5,435,429 A | 7/1995 | Van Den Goor | |
| 6,092,801 A * | 7/2000 | Abbadessa | H02K 41/02 198/805 |
| 6,283,271 B1 * | 9/2001 | van den Goor | B65G 47/844 198/370.02 |
| 6,513,642 B1 * | 2/2003 | Shearer, Jr. | B65G 47/844 198/370.02 |
| 6,615,972 B2 | 9/2003 | Veit | B65G 47/844 198/370.02 |
| 6,648,126 B2 * | 11/2003 | Mayer | B25J 5/02 198/349 |
| 7,086,519 B2 * | 8/2006 | Veit | B07C 5/362 198/370.02 |
| 7,240,781 B2 * | 7/2007 | Ramaker | B07C 5/362 198/370.02 |
| 7,281,710 B2 * | 10/2007 | Okazaki | B65G 57/04 198/370.13 |
| 7,597,187 B2 * | 10/2009 | Bausenwein | B41F 13/00 198/580 |
| 8,382,106 B2 * | 2/2013 | Noll | B41F 13/0045 271/204 |
| 8,807,327 B2 * | 8/2014 | Hofrichter | H02K 41/033 198/619 |
| 9,783,370 B2 * | 10/2017 | Fujihara | B65G 43/08 |
| 2005/0061195 A1 | 3/2005 | Lutz et al. | |
| 2009/0107806 A1 | 4/2009 | Mendenhall | |

FOREIGN PATENT DOCUMENTS

| | | |
|---|---|---|
| DE | 102006034395 A1 | 2/2007 |
| DE | 102009010280 A1 | 10/2009 |
| EP | 0137179 A1 | 4/1985 |
| EP | 1123886 A1 | 8/2001 |
| EP | 2747257 A2 | 6/2014 |
| KR | 1020030013868 A | 2/2003 |
| WO | 2003029651 A2 | 4/2003 |
| WO | 2005110898 A2 | 11/2005 |
| WO | 2010085141 A1 | 7/2010 |
| WO | 2010085670 A1 | 7/2010 |
| WO | 2016096856 A1 | 6/2016 |

OTHER PUBLICATIONS

International Preliminary Report on Patentability; International Applciation No. PCT/EP2015/079791; Interational Filing Date: Dec. 15, 2015, dated Dec. 18, 2014, 10 pages.
International Search Report; Application No. PCT/EP2015/079791; International Filing Date: Dec. 15, 2015, 4 pages.

* cited by examiner

MOVEMENT DEVICE

CROSS-REFERENCES TO RELATED APPLICATIONS

This patent application is a 371 of International Application No. PCT/EP2015/079791, filed Dec. 15, 2015 which claims the priority of German Application No. 102014119110.2, filed Dec. 18, 2014, each of which are incorporated herein by reference in their entirety.

The present invention relates to an apparatus for moving objects. The objects can, for example, be packs, components, e.g. from the automotive sector, tools, e.g. screws, nails, screw anchors, or completed or incomplete products of any kind. The products can in particular be portions that each comprise at least one slice cut off from a food product. The cutting off can take place with the aid of a slicing apparatus, in particular a high-performance slicer, having a circular blade or a scythe-like blade revolving in planetary motion and/or rotationally.

The objects, e.g. screws or food portions, can in particular already be placed in parts of a packaging, e.g. trays.

The movement apparatus comprises a plurality of individually movable transport movers for the transport of the objects. The movement apparatus furthermore comprises a path system for the transport movers in which the transport movers are movable along at least one predefined path in a transport direction and a control device for controlling the movement of the transport movers in the path system, wherein the transport movers each comprise at least one runner cooperating with the path system and at least one carrier for objects attached to the runner.

A transport system which can generally be used for the invention and to which reference will explicitly be made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is provided by permanent magnets. When the runner of the linear motor carries the permanent magnets and the stator of the linear motor generates the electromagnetic traveling field, the drive principle of an LSM drive can be figuratively imagined such that the transport mover provided with the permanent magnet is pulled over the transport line by the magnetic field moving along the stator. Such a transport system or drive principle is described, for example, in WO 2003/029651 A2 and WO 2010/085670 A1. Reference is herewith explicitly made to these documents with reference to the disclosure of a possible drive principle or function principle for the invention.

The path system or the individual paths of such a transport system can be divided into a plurality of consecutive path elements which so-to-say each form a single linear motor and can be individually controlled by a control device. If the transport movers located in the path system can be identified simultaneously by means of the control device, generally any desired number of transport movers can in this manner be operated simultaneously in a path system of generally any desired complexity and can be individually moved in this respect.

The above-mentioned company MagneMotion, Inc. uses a technique for the identification and localization of the individual transporters in the path system in which each transporter mover is provided with a transducer which induces a signal in the stator formed by the path system, whereby it makes it possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the paths into a plurality of path elements—which so-to-say each represent a single linear motor—that no collisions occur between consecutive transporter movers. A transport mover can thus only travel into the next path element when it is permitted by the control device, which is in particular not the case when another transport mover is located in the path element.

Against the background of this generally known transport system, provision is made in a possible embodiment in the invention that the path system is configured as a stator of the linear motor.

The runner is in particular a respective component of a linear synchronous motor, with the runner in particular comprising at least one permanent magnet and the path system being configured as a motor stator.

The path system is in particular divided into a plurality of path elements which in particular each represent a single linear motor and which are individually controllable by the control device.

The transport movers are preferably identifiable by the control device.

The transport movers can furthermore be localized in the path system by the control device.

The transport system has a plurality of transport movers whose total number depends on the respective application. Provision can be made that the path system comprises several dozen up to some hundred transport movers, i.e. a positive "cluster" of transport movers can be present in the path system to transport a plurality of objects and optionally to carry out additional functions such as a buffering, a distribution and/or an association of objects, in particular portions.

Conventional carriers pick up the objects in a central position above the runner. Cutting residues or cutting waste can thus reach the path, for example, in the food sector. In other applications, paper residues, wood chips, metal parts such as screw parts, fluids or plastic residues can reach the path, for example. This is substantially due to the fact that the objects are arranged above the runner and thus also above a stator sensitive to contamination and/or above associated guides of the path system. In addition, there is the problem with conventional carriers that they are not rigidly connected on the runner, but rather have a certain clearance. Disturbing movements of the carrier, in particular an unwanted "wobbling" of the carrier, relative to the runner can thereby in particular occur on the picking up of objects or on the placing down of objects.

It is therefore an object of the invention to provide a movement apparatus for products that has an improved arrangement of at least a part of a carrier relative to the runner.

This object is satisfied by the apparatus each having the features of the independent claims.

In accordance with an aspect of the invention, the carrier is at least temporarily in a protruding position in which the carrier protrudes laterally at least with a pick-up region for the objects. The pick-up region in particular protrudes in this respect relative to the path or to the runner of the transport mover. The pick-up region is preferably a carrier region, a load pick-up region or a load placement region, that is a region in which the objects are picked up, handled, carried and/or placed down. The pick-up region is preferably a pick-up surface for the objects.

The carrier can in particular only protrude at one single side. It is, however, generally also conceivable that the carrier has a plurality of pick-up regions that protrude laterally. Due to the pick-up region, the carrier is preferably asymmetrical with respect to the path, in particular with respect to the stator or the runner.

In accordance with the invention the pick-up region can in particular be moved through regions sensitive to contamination, e.g. in pick-up or removal regions for the objects, while the runner or the path is led laterally offset therefrom.

Contaminants thus do not reach the runner or the path. The arrangement of the carrier relative to the path can be considerably improved in this manner.

Further developments of the invention can also be seen from the dependent claims, the description and the enclosed drawings.

In accordance with an embodiment, the pick-up region is arranged laterally offset from a stator of the path system, from the runner and/or from a guide for the transport mover in the protruding position. The guide can in particular be part of the path. The guide preferably comprises guide rails, in particular a pair of rails. The objects can preferably be placed laterally onto the protruding region of the carrier and can be transported thereon. The runner and/or the path system, in particular the stator and/or the guide for the transport movers, is spatially separated from the objects in this manner. Contaminants and influences, in particular external influences, during the handling of objects are thereby kept away from the runner and from the path system. Contaminants are in particular disadvantageous in the region of the guide since they impair the movements of the transport movers on the path system and may possibly result in a blocking of the transport movers. Deposits in solid and liquid form generally result in a more complex cleaning.

In accordance with a further embodiment, the carrier is permanently or temporarily located in the protruding position. The carrier can, for example, be formed as a solid component and can be rigidly arranged at the runner. This variant can be implemented in a particularly inexpensive manner. Alternatively, the carrier can also be movable such that at least the pick-up region can be moved, in particular displaced, into the protruding position. The carrier can thus in particular only be located in the protruding position in regions of the path sensitive to contamination or in functional regions, e.g. in cleaning regions or transfer regions for transferring the objects. If, in contrast, the transport mover moves normally on the path system, the carrier can thus, for example, be transitioned into a central position so that the objects can be located, in particular centrally, above the runner or the track and/or in the ideal position of center of gravity. This is in particular advantageous in applications relevant to practice in which, on normal transport, the risk of contamination is rather small and the carrier is arranged in a more stable manner in a central position than in the protruding position.

In accordance with a further embodiment, the carrier is adjustable, in particular displaceable, in particular automatically, into the protruding position from a normal position in which the carrier is arranged at least substantially centrally above a stator of the path system and/or above the runner. The carrier can preferably be displaced at a right angle to the extent of the path. The central arrangement can relate both to the dimensions of the carrier and to the position of center of gravity of the carrier and the object. The displacement of the carrier from the normal position into the protruding position can in particular take place by an influence from the outside. In this respect, guides are, for example, conceivable that displace the carrier. In addition to mechanical guidance systems, magnets are, for example, conceivable that draw the pick-up region to the outside.

It is, however, generally also conceivable that the transport mover itself has a mechanism by which the carrier can be adjusted into the protruding position and/or can also be retracted therefrom.

In accordance with a further embodiment, the carrier is at least temporarily supported rotatably relative to the runner. The carrier can in this respect in particular be adjusted in dependence on the position or on the region on the path, preferably in corner regions.

In accordance with a further embodiment, at least one guide for the carrier is provided at least sectionally, with the guide for the carrier in particular differing from a guide for the runner. The carrier, in particular the laterally protruding pick-up region of the carrier, can thus be supported. This is in particular sensible with comparatively heavy objects. The performability of the magnetic conveying system can be increased by the increased payload.

The guiding for the carrier can take place in the total path system. It is alternatively also conceivable that the guide for the carrier is only provided in specific part regions of the path, in particular in regions in which objects are located on the carrier, in regions sensitive to contamination and/or in functional regions. A guide for the carrier can also be sensible in corner regions so that the carrier or the objects located thereon can be securely guided.

The guide for the carrier can in particular have a round, rectangular, angled and/or trapezoidal cross-section. The guide can in particular have a guide rail. The guide can preferably be arranged at the side. The guide can in particular extend in parallel with the path. The guide can preferably be fixed to the path or to a lower frame of the path.

In accordance with a further embodiment, the guide for the carrier cooperates with a laterally protruding region of the carrier, in particular its end region. The guide can thus preferably be arranged on the side of the protrusion, i.e. of the pick-up region, in order thus to support an object located thereon or the protruding pick-up region of the carrier itself.

In accordance with a further embodiment, the guide cooperates with at least one non-protruding lateral region of the carrier. It is, for example, conceivable in this respect that a respective guide is provided at both sides of the carrier. Alternatively, the guide can also only be provided at the non-protruding side when, for example, a removal of the objects takes place e.g. from the other side, in particular by an engaging beneath by a fork of a robot blade.

In accordance with a further embodiment, the carrier comprises a holding apparatus that cooperates with the guide and that in particular at least partly engages around the guide and/or lies on the guide and/or contacts the guide. The carrier can thus be securely guided at the guide.

In accordance with a further embodiment, the holding apparatus comprises a rolling means and/or a sliding section having a friction-reducing material. The rolling means can in particular be rollers and/or wheels. The friction-reducing material can comprise a plastic material, for example. A sliding section is in particular sufficient when only a comparatively short part line over the path has to be bridged. The carrier can be guided substantially free of friction at the guide with the aid of the rolling means or of the sliding section.

In accordance with a further embodiment of the invention, the transport mover is provided with a counterweight to balance the pick-up region. The counterweight is in particular attached to the carrier or to a holder or to a crossbeam for the carrier. The counterweight consequently does not have to be directly attached to the carrier. A holder or a crossbeam is preferably provided at the mover or at the runner of the mover and has a protruding region to which the carrier is attached that then protrudes in this manner and is provided with the pick-up region for the objects.

The counterweight is preferably variable to adapt to a weight to be balanced.

In accordance with a further embodiment, the carrier is provided at a non-protruding lateral region with at least one counterweight. The counterweight can in particular be arranged in, at, on or beneath the carrier. A compensation with respect to the protruding pick-up region can be provided by the counterweight. The center of gravity of the carrier is in this respect preferably located above the runner or of the stator of the path, and indeed in particular also when an object is positioned on the pick-up region.

In accordance with a further embodiment, the size of the counterweight and/or the position of the counterweight relative to the carrier is variable to adapt to the weight of the object located on the carrier. The counterweight can in this respect in particular be displaceable, pluggable and/or magnetically fixable. The carrier can also be rotatable, whereby a compensation of the weight can likewise take place. The carrier can preferably be flipped over so that the weight is symmetrical with respect to the path.

The counterweight can in particular be variable by a fluid, in particular a liquid, that flows around within the carrier and is displaced. The counterweight can in this manner preferably be automatically adapted to the weight of the object and can adopt the required position.

In accordance with a further embodiment, the carrier and/or the counterweight can be removed from the runner, in particular automatically and preferably with a moving transport mover. Different carriers can in particular be provided with different counterweights or different centers of gravity. The carriers can each be selected to match the object to be transported. The carrier or the counterweight can, for example, be releasably plugged, clipped, pushed and/or screwed to the runner or to the carrier. A magnetic connection between the carrier and the runner or the counterweight and the carrier is generally also conceivable. The carrier can in this respect be removed manually or automatically.

In accordance with a further embodiment, the removed carrier is at least temporarily conveyable by a drive provided in addition to the path system, wherein the drive in particular takes over the guiding of a corresponding section of the path. The removed carrier can in particular be transported with the aid of a moving conveyor belt.

In accordance with a further embodiment, a part region of the path extends next to a region sensitive to contamination and/or next to a functional region. The protrusion, i.e. the pick-up region of the carrier, can thus in particular project into the region sensitive to contamination, e.g. into a region in which objects are picked up or placed down. The protrusion can also project into a functional region, e.g. into a cleaning region or transfer region, while the path can extend laterally offset from this functional region. The objects can be treated, handled, picked up and/or placed down in the functional region. The path is therefore always guided at a specific spacing from the regions sensitive to contamination or from the functional regions so that no contaminants reach the path itself.

In accordance with a further embodiment, a cover is provided that laterally covers a region of the runner facing a laterally protruding region of the carrier. A separation or a shielding can be provided between an electronics section or an electrotechnical region, on the one hand, and the carrier, on the other hand. Contaminants thus remain in the region of the objects and are not transferred to the path.

This is in particular also advantageous with vertical path systems. A separation between the electrotechnical region and the region of the objects can in this respect also take place by the cover. The objects can thus always be conveyed next to the path system.

The objects can be combed off for the transfer of the objects between a horizontal path system and a vertical path system. The horizontal line sections can e.g. be present in the slicing region and in the transfer region to a packaging apparatus. A vertical system can e.g. form a distribution region and/or buffer region therebetween. In the vertical system, the design, e.g. the sealing, is in particular simplified since the working region and the electrotechnical region can in this respect simply be separated from one another. It is furthermore advantageous that such a buffer is flexible and the objects do not have to be removed again according to the order of their arriving. The transport movers can furthermore be moved to different vertical levels in a vertical system. Paths placing objects down, on the one hand, and paths picking up objects, on the other hand, can thus be at different levels. This can be helpful if a system part requires a specific construction height. The total system does not have to be built in an elevated manner due to the vertical system, which would result in ergonomic disadvantages. With conventional conveyor belt systems, different vertical levels require long, slanted belts. The layout of the path system can, in contrast, be adapted with respect to a space requirement and to a flexible arrangement by the path system in accordance with the invention having at least vertical sections.

In accordance with a further embodiment of the invention, at least one pair of cooperating transport movers is provided that form, together with their pick-up regions, a common, laterally protruding pick-up region for the objects.

Such mover pairs are consequently effective as a kind of "tandem" in order together to provide a pick-up region for objects.

It has been found that such a transport principle can be used particularly efficiently with transport movers having a laterally protruding pick-up region. A common, laterally protruding pick-up region can in this respect either only be provided at one side of the mover tandem, with the carrier alternatively also being able to protrude at both sides.

In accordance with an embodiment, the two transport movers can be movable relative to one another for the placing down of objects such that the pick-up regions are movable away beneath the objects. The relative movement preferably takes place so fast that the objects so-to-say have the "floor pulled from under their feet" using the inertia principle. For example, an intermediate space can arise simply by moving apart the two movers between the individual pick-up regions previously forming the common pick-up region. Depending on the properties of the objects, they can fall downward substantially without a lateral offset on a moving part of the movers if the pick-up regions are moved away beneath the objects sufficiently fast.

Figure 15:
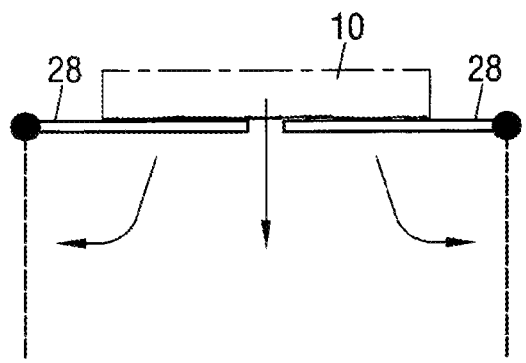
Figure 16:
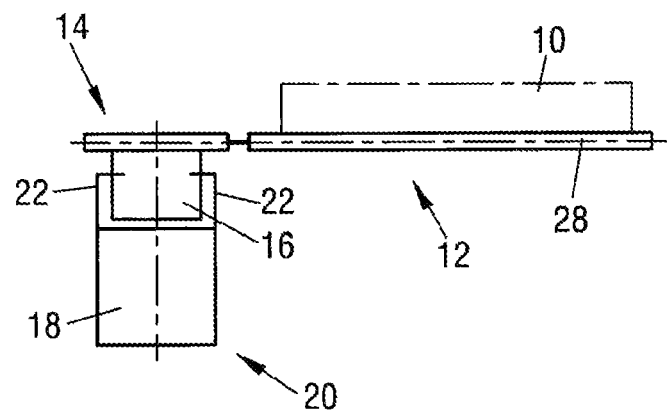
Figure 17:
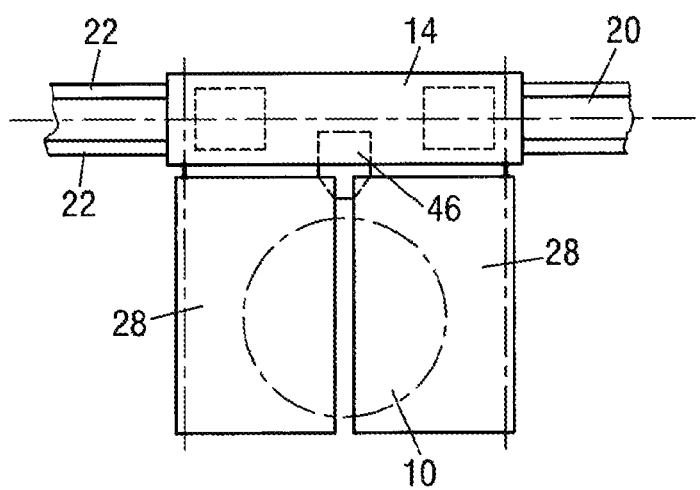

Alternatively or additionally, a "trapdoor" arrangement can also be provided such as is described in detail in conjunction with FIGS. 15 to 17. The flapping movement can, for example, be triggered by moving the two movers apart. A triggering apparatus for the flapping procedure independent of the movers is alternatively possible.

In accordance with a further embodiment of the invention, at least one of the pick-up regions of the two transport movers can be movable relative to a placement aid cooperating with the objects on the placing down. The placement aid can e.g. be configured as a scraper, as a scooper, as a peeler and/or as a position fixer.

Provision is in particular made that the placement aid is attached to the other transport mover and/or is movable together with the other transport mover. Such placement aids can prevent objects from moving away with the respective mover in an unwanted manner from a desired placement position when the two movers are moved apart.

In accordance with a further embodiment, the two transport movers are coupled to one another by a length-variable coupling device. A greater movement stability can in particular be achieved by such a coupling device, which means a smaller influence on the objects that are simultaneously transported by two transport movers and that would otherwise be disturbed by relative movements between the two transport movers.

The coupling device can, for example, comprise one or more telescopic coupling elements. The coupling device is preferably rotatably or pivotably supported at least one respective point at both transport movers.

In transport operation, the two transport movers can be controlled and can be moved in the path system such that the spacing of the two pick-up regions does not vary. In this respect, the "part carriers" formed by the pick-up regions can be disposed at a small spacing opposite from one another. The part carriers can, however, alternatively also overlap or contact one another.

In accordance with a further aspect of the invention, a stabilization apparatus is provided that restricts a movability of the carrier relative to the runner at least temporarily.

In accordance with the invention, a clearance or a wobbling of the carrier is in particular prevented or at least minimized. A certain clearance between the carrier and the runner can generally be desirable to ensure a movement of the transport movers on the path system that is as good as possible. Irregularities in the guidance for the carrier can thereby in particular be compensated.

The force absorption can preferably be achieved as completely as possible via the stabilization apparatus. In accordance with the invention, the arrangement of the carrier relative to the runner is thus at least optimized in specific regions of the path.

In accordance with an embodiment, the stabilization apparatus is effective along the total path or in at least a part region of the path. The stabilization apparatus can thus in particular be effective in critical regions, e.g. in transfer regions, in which the objects are placed, for example, at a packaging apparatus. Grippers, in particular pickers, of a robot can remove portions from the carrier here, in particular in the food sector, for example. It is in this respect helpful for an exactly positioned pick-up and later placing down of the portions if the carrier does not move relative to the runner. A stabilization can also be advantageous in corner regions. The carrier can in particular also be sloped in corner regions so that the objects are held in the path and are not thrown out of the path by centrifugal forces.

The stabilization apparatus can preferably act on the carrier at both sides or only at one side.

In accordance with a further embodiment, the stabilization apparatus is arranged at the path. The stabilization apparatus preferably corresponds to at least one transport mover. The stabilization apparatus is in particular not an element of the transport mover. The stabilization apparatus can preferably be integrated in the guide for the transport movers. The guide can e.g. thus be a little spread apart locally.

The stabilization apparatus in particular generally acts on all the transport movers, in particular transport movers moving past, or only on a selection of transport movers in dependence on the operating state or on the product. Only specific transport movers can thus in particular be stabilized.

In accordance with a further embodiment, the stabilization apparatus comprises at least one support element, in particular a holding element, for the carrier, wherein the support element can in particular be brought into engagement with a lower side of the carrier. The carrier can lie on the support element in this manner, for example. The support element can in particular comprise stop slopes or run-on slopes. A detection device can grasp the carrier or can engage into it in the region of the support element. A synchronization, e.g. with a gripper, in particular a picker, of a robot can also take place in this manner. The robot can in this respect optionally also serve as a dragging aid for the transport mover. The drive of the transport mover is in this respect at least partly taken over by the robot intervening on the transport mover. The support element can in particular vertically and/or horizontally absorb gripper forces that can also be transferred to the carrier via the respective object, e.g. a food portion. The support element can in this respect in particular be located close to the carrier so that a contact, that is practically a placing or touching, already takes place on a small force introduction from above. The stabilization apparatus is preferably selected such that a gap is maintained, where possible, between the lower side of the transport mover and the stator of the path system, i.e. the transport mover is in particular not completely seated on the stator.

In accordance with a further embodiment, the carrier and/or the transport mover can be raised by means of the stabilization apparatus. The carrier can in this respect in particular so-to-say be "jacked up" to a desired height so that the carrier can then preferably have a relation to an associated gripper or placement belt and not to the stator in this part region. The carrier is therefore preferably raised. This raising is made possible, for example, by a vertical sliding movement in a correspondingly designed guide in the transport mover.

The gap to be maintained between the lower side of the transport mover or of the runner and the track for the proper drive can be maintained in this respect. The transport mover can in particular also be slightly raised together with the carrier and can be pressed from below toward the stabilization apparatus and/or guide. The gap can thereby become a little larger, which can produce a temporary blocking of the transport movers on the path.

In accordance with a further embodiment, the stabilization apparatus is arranged fully or partly at the carrier. The carrier can in this respect, for example, comprise integrated rollers, preferably having different degrees of hardness, sliding regions and/or magnets. A conventional path system can be made use of in this embodiment variant. The path itself consequently does not have to be modified. Transport movers that have a stabilization apparatus can thus be used, for example, at conventional path systems.

The carrier can also have specifically configured sliding zones and/or support zones, e.g. for an at least temporary vertical and/or lateral guidance, in edge regions or at the lower side. An edge region can in this respect in particular be chamfered so that the carrier can be supported from the side.

In accordance with a further embodiment, the stabilization apparatus is active or passive. The stabilization apparatus can in particular only be moved, coming from the outside, to the carrier at a part region of the path, in particular at a transfer region. The carrier can in this respect so-to-say be clamped in. A support from below and/or from the side can in particular take place in this respect.

In accordance with a further embodiment, the stabilization apparatus is configured to actively convey the carrier. The stabilization apparatus can in this respect comprise belts, chains, rollers and/or balls. An active conveying can also take place, for example, with the aid of a gripper of a robot. The stabilization apparatus can furthermore comprise a conveyor belt. A plurality of rollers, preferably having different degrees of hardness, can in particular be provided at the path. The hardness of the rollers can in particular increase toward the center.

Both the gripping forces can in particular be taken up and the movements of the transport movers can be supported.

Rollers of the carrier can also be driven. These active drives of the stabilization apparatus can alternatively or additionally be active for the actual drive of the path system. The drive by the stabilization apparatus can in particular only be provided at a part region of the path. The drive by the stabilization apparatus can also take place at a different speed than the speed predefined by the actual drive of the path system, e.g. with the aid of the movement of the grippers or of the transfer device.

In accordance with a further, independent aspect of the invention, the carrier is at least temporarily rotatably supported relative to the runner. The carrier can, for example, rotate to any desired degree. The rotation can alternatively also be limited to 90° or 180°. The carrier can preferably be rotated between two 90° positions. Catches, slits and/or a toothed arrangement can in particular be provided. The carrier can, for example, latch into place such that the carrier can be fixed to the runner and is thus only temporarily rotatable.

If the carrier protrudes laterally, the carrier can in particular be rotated such that the protrusion is oriented in parallel with the path. A lateral protrusion is thus no longer present in this position. The carrier or objects located thereon can consequently be securely guided on the path. The placement pattern of the portions, e.g. of the folded portions, is thus in particular not disturbed during the passing through of specific regions, in particular corner regions.

In accordance with an embodiment, the carrier is rotatable at a predefined position or in a predefined region of the path system, in particular in a corner region of the path system. The carrier is preferably rotated relative to the runner for moving through a corner, for example a 180° corner, and indeed in particular such that the orientation or alignment of the carrier in space does not vary. Corners can thereby be moved through uniformly, and indeed in particular since the same centrifugal forces hereby act on the objects as at the path center when the carrier tracks. With a double carrier, i.e. a carrier having two lateral protrusions, the position of the objects can vary at a 180° corner, i.e. objects that were arranged at the inside before the corner are subsequently arranged at the outside, and vice versa.

The so-to-say parallel manner of movement of the carriers in corner regions is also helpful during the transfer, that is during the picking up and placing down, of objects. The carrier can be precisely positioned in corner regions, with the extent of the path or the design of the path in particular being able to remain compact.

A positioning, a position control and/or a guide can in particular be associated with the carrier, preferably in corner regions of the path system. This positioning, position control and/or guide can be provided close to the axis of rotation of the carrier at the transport mover, in particular in the manner of a pivot bearing.

An engagement apparatus, in particular a toothed section or a gear rack, can preferably be provided that is in particular arranged at a marginal region of the path. The engagement apparatus can be configured to engage at a region of a pick-up for the carrier at the transport mover and to rotate the carrier. The carrier can be latched or fixed on movements outside corner regions. The carrier can be slightly raised and rotated out of this support, e.g. in corner regions. After moving through the corner, the carrier can in particular lower again and latch in again.

In accordance with a further embodiment, the carrier is automatically rotatable, in particular by means of an external or internal mechanism. The actuation of the latching mechanism can in particular take place by means of external or internal influences. A servomotor can also be provided at the transport mover and can rotate the carrier in dependence on the current position in the path. The carrier can thus e.g. be rotated in accordance with a progression of a corner or can also be rotated freely in another region, e.g. by 180°.

A guide for the carrier can in particular be provided at least in part regions of the path or of the path system. This is, however, not compulsory, i.e. a guide for the carrier can also be dispensed with so that the requirement for additional attachments is reduced.

The arrangement of the carrier relative to the runner is consequently generally improved by the invention. A free position control for the carrier can in particular be implemented.

In accordance with a further embodiment, at least one support which is elastically deformable at least regionally is provided at at least one transport mover between the carrier and the runner, with the support preferably being formed as a skateboard axle.

Skateboard axles, that are also called trucks, are generally known. It can be achieved by the invention when applying this principle that the carrier can move relative to the runner like the board, also called a deck, on a skateboard can move relative to the rollers. This can be advantageous for specific applications.

Provision is in particular made that the carrier is attached via an elastically deformable support to at least two runners. A slanted position of the carrier relative to the runners and thus relative to the path system results from the adjustment movements or interleaving of the elastic supports on a cornering of such a transport mover provided with at least two runners, for example. This can e.g. be utilized to provide an automatic tilt of the carrier during cornering such that higher cornering speeds can be achieved or such that the transport security for the objects can be increased.

All the embodiments of the apparatus described here can be respectively combined with one another.

Figure 5:
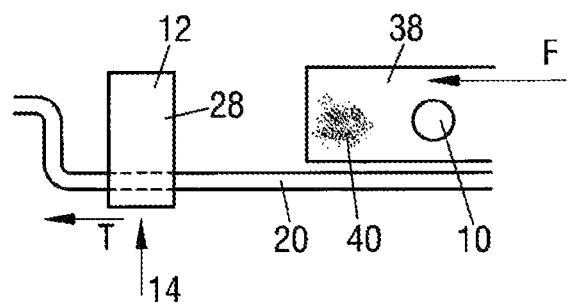
Figure 6:
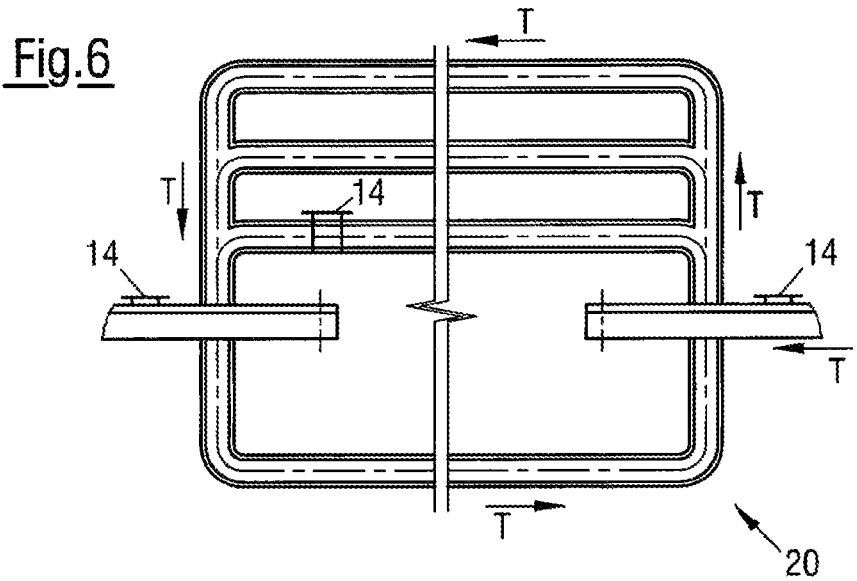
Figure 7:
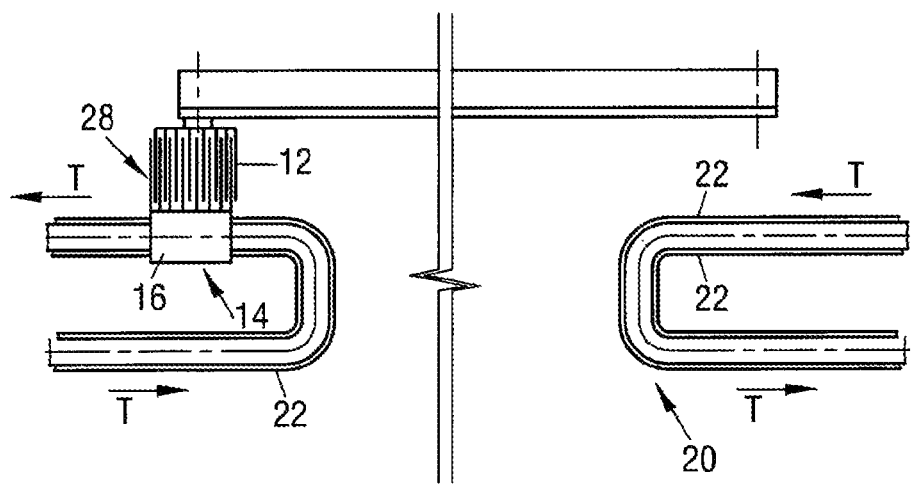
Figure 8:
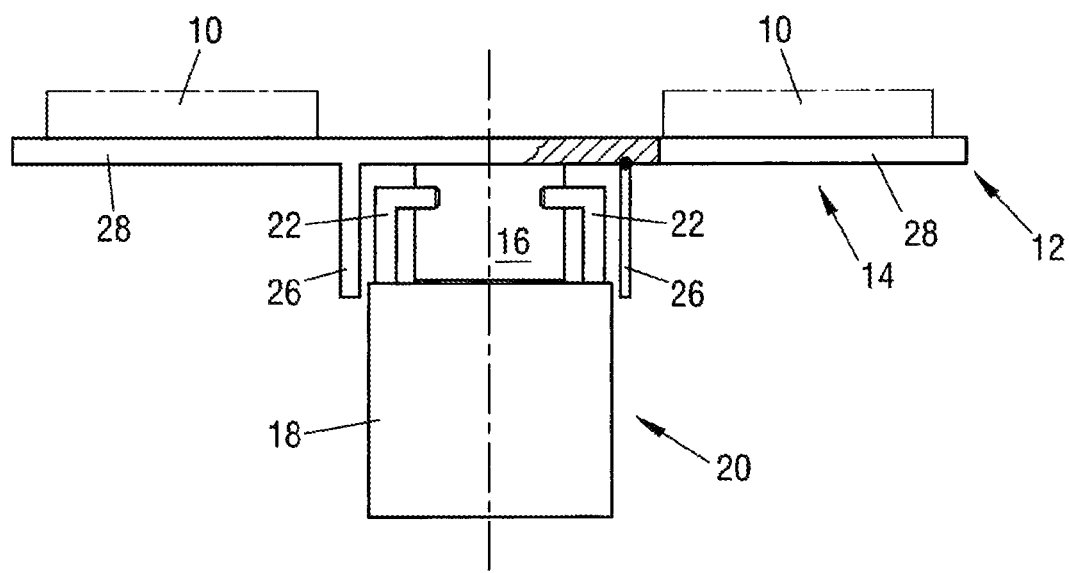
Figure 9:
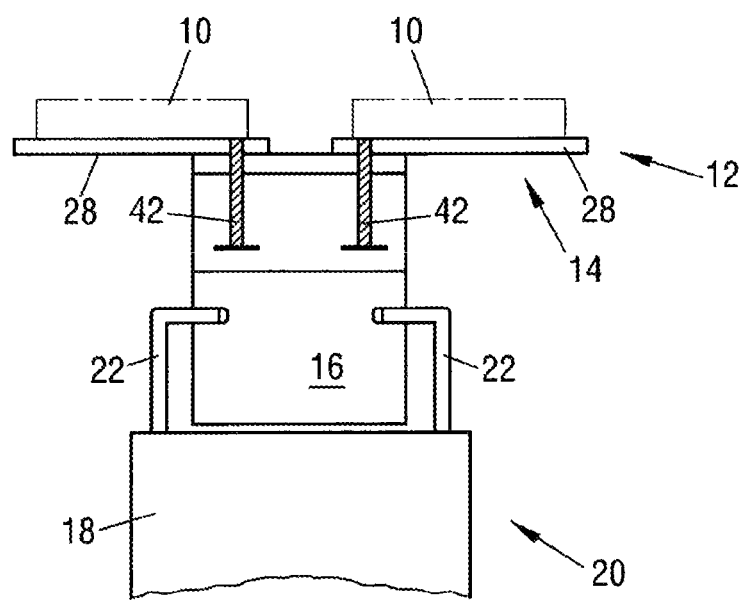
Figure 10:
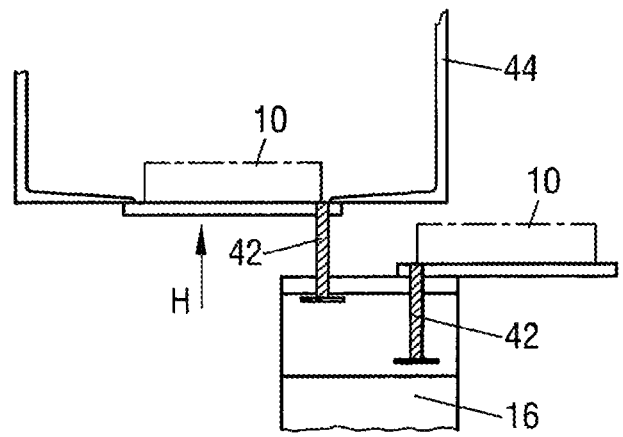
Figure 18:
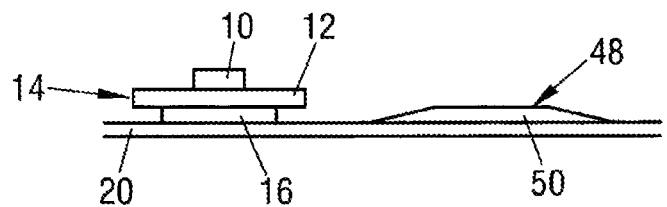
Figure 19:
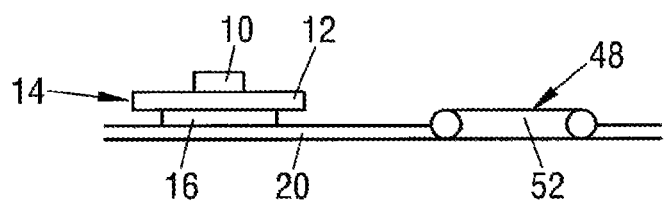
Figure 20:
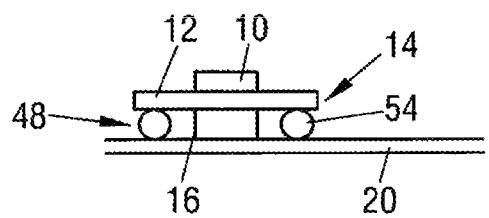
Figure 21:
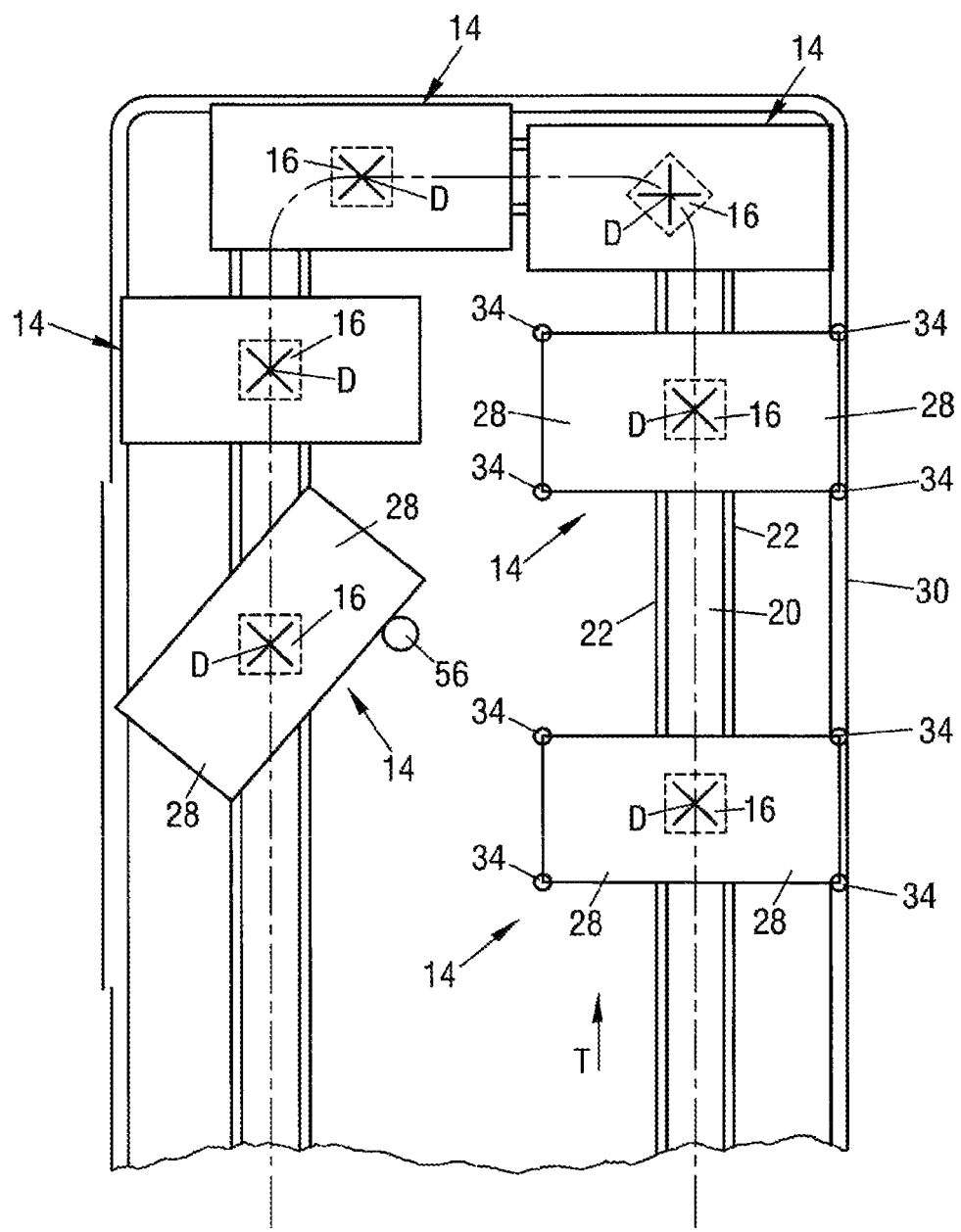
Figure 22:
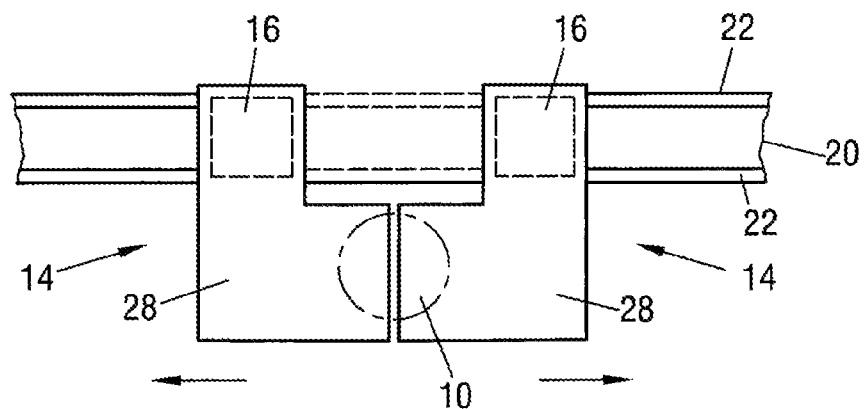
Figure 23:
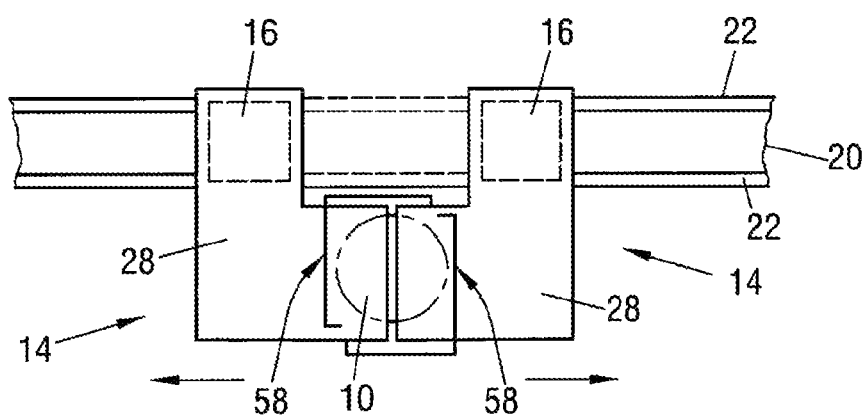

The invention will be described in the following by way of example with reference to the drawings. There are shown:

FIG. 1 to FIG. 4 sectional views of different embodiments of a movement apparatus in accordance with the invention;

FIG. 5 a plan view of an embodiment of a movement apparatus in accordance with the invention;

FIG. 6 a front view of an embodiment of a movement apparatus in accordance with the invention;

FIG. 7 a plan view of an embodiment of a movement apparatus in accordance with the invention;

FIG. 8 to FIG. 10 sectional views of different embodiments of a movement apparatus in accordance with the invention;

FIG. 11 to FIG. 14 plan views of different embodiments of a movement apparatus in accordance with the invention;

FIG. 15 and FIG. 16 sectional views of different embodiments of a movement apparatus in accordance with the invention;

FIG. 17 a plan view of an embodiment of a movement apparatus in accordance with the invention;

FIG. 18 to FIG. 20 sectional views of different embodiments of a movement apparatus in accordance with the invention; and FIG. 21 a plan view of an embodiment of a movement apparatus in accordance with the invention; and FIGS. 22 and 23 plan views of two further embodiments of the invention that each relate to a "tandem mover".

It must first be noted that the embodiments shown are of a purely exemplary nature. Any desired objects can in particular be transported. The features of an embodiment can also be combined as desired with features of another embodiment.

An apparatus for moving portions 10 is shown in FIG. 1. The objects can, for example, respectively be a portion of a food product, for example sausage, cheese, ham, meat or the like, comprising one or more individual slices. The invention can, however, generally also be used outside the food sector.

The term "portion" is to be understood as broad within the framework of the invention. A portion can accordingly consist of only one single slice. Alternatively, a portion can comprise a plurality of slices which can be present in a relative arrangement of generally any form, for example in a so-called stacked or overlapping arrangement such as is familiar to the skilled person in the technical field in question here. The portion can be a total portion such as is subsequently packaged and offered for sale on the market. Alternatively, the portion can be a part portion which only forms a total portion together with one or more further part portions which can in turn each comprise one or more slices. The part portions of a total portion can be formed from different product sorts so that a multi-sort portion can be produced by assembling a plurality of part portions and so that a multi-sort pack is thus present after its packaging. The slices can, for example, be comparatively thin slices such as are generally known in the form of assorted slices of sausage or of cheese. Alternatively, the slices can each be pieces that are relatively thick in comparison with assorted slices such as pieces of fresh meat.

In other words, a portion within the framework of the invention is the unit which is the smallest with respect to the transport task, which has to be transported over a specific line, on the one hand, and which optionally—depending on the application—additionally has to be put into relation with further portions, on the other hand, to satisfy the respective demands of the total system which comprises one or more slicing apparatus, in particular slicers, the path system, and one or more packaging apparatus, and indeed for example with respect to the formation of formats such as have to be provided for the respective packaging machine provided.

The object 10 can generally also be bread, chocolate or other foods. Packets, packages, tools, components, single parts or finished products can also be transported.

The object 10 is arranged on a carrier 12 of a transport mover 14 that comprises a runner 16.

The transport mover 14 can transport one or more objects 10. It is alternatively also possible that a plurality of transport movers 14, in particular two transport movers, transport an object 10 together. The transport movers 14 can in this respect be moved together on a path system 20 as a unit in a coordinated manner. In this manner, larger loads, in particular heavier objects 10 and/or objects 10 larger in area, can also be moved on the path system 20 than with only one transport mover 14. Two transport movers 14 can in particular be provided beneath a protruding carrier 12 to ensure sufficient parallelism with respect to the path system 20.

The runner 16 cooperates with a stator 18 in the manner of a linear motor. The stator 18 is a part of the path system 20 on which the transport movers 14 can move. A guide 22 is provided to guide the transport movers 14. The guide 22 is part of the path system 20 and can be configured as a pair of rails, for example. The path system 20 furthermore comprises an electrotechnical unit 24 in which further electronic components such as plugs and/or leads can be stowed. The path system 20, in particular the electronic components, is/are protected from contamination and are separated from the working region by means of a cover 26.

The carrier has a pick-up region 28 for spatial separation between the region for the electronics and the working region. The pick-up region 28 protrudes laterally and offers a holding surface for the object 10.

A guide 30 for the carrier 12 is provided to support the carrier 12 laterally. The guide 30 can be supported on a base frame or can be arranged laterally at the cover 26 via webs. The cover 26 can in turn itself also be part of a base frame for the path system 20.

The carrier 12 can have a holding apparatus 32 at the contact point between the guide 30 and the carrier 12. The holding apparatus 32 can, for example, be a sliding section having a friction-reducing material. It is also possible that the holding apparatus 32, as shown, comprises a rolling means 34 that can move on the guide 30.

In accordance with the invention, objects 10 are only loaded onto the pick-up region 28 of the carrier 12 and are transported on it. The region above the runner 16 or of the stator 18 in this respect remains free of objects 10. A spatial separation thus takes place between an electrotechnical region sensitive to contamination or the path system 20, on the one hand, and a working region, on the other hand. The cover 26 is provided to avoid the transfer of contaminants between the regions. It separates the electrotechnical region from the working region. The guide 30 in this respect supports the protruding pick-up region 28 and stabilizes the movement of the transport movement 14 on the path system 20 overall.

Figure 2:
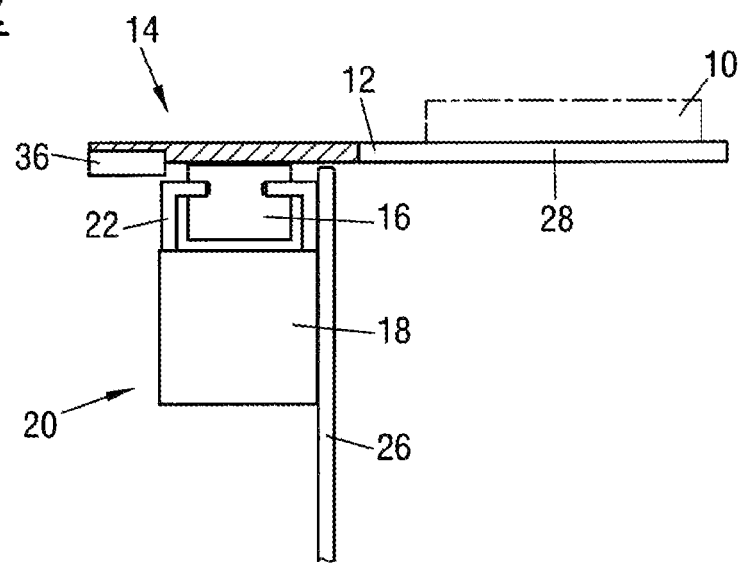

A counterweight 36 is provided in the embodiment shown in FIG. 2. The counterweight 36 can compensate the weight force that arises by the pick-up region 28 and the object 10 located thereon. The center of gravity of the carrier 12 is in this manner again located substantially above the runner 16 or the stator 18.

The carrier 12, in particular the pick-up region 28, can be configured as a continuous, planar surface. It is, however, advantageous if at least the pick-up region 28 is formed as a grid or as a rake. In this respect, a gripper, for example, that can likewise comprise a grid or a rake, can namely engage into the pick-up region 28 from below and can thereby remove objects 10 from the carrier 12. Alternatively, the carrier 12 can also in particular comprise a conveyor belt from which objects, in particular portions, can be placed directly e.g. into a packaging apparatus.

Figure 3:
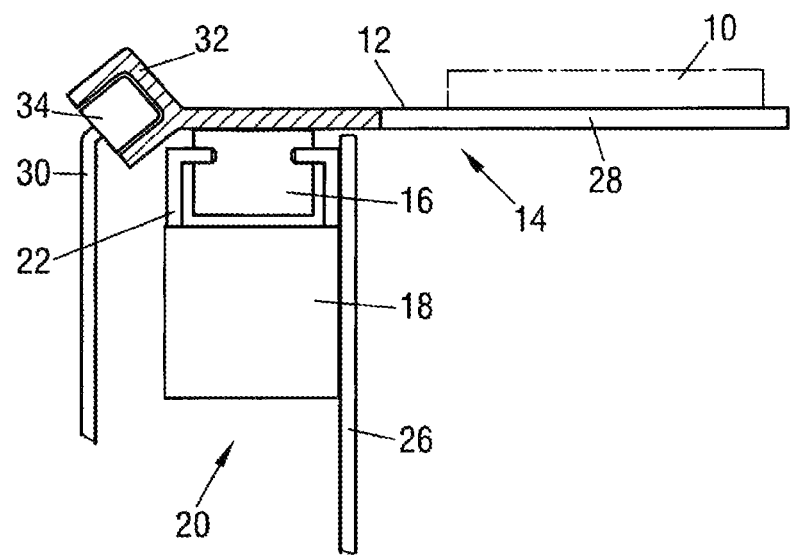

In the embodiment shown in FIG. 3, the holding apparatus 32 of the carrier 12 is configured as a pick-up fork. A rolling means 34 of the guide 30 in this respect engages into the holding apparatus 32. A sliding guide can also be provided instead of a rolling means 34. The guide 30 can be rigidly fixed, e.g. to a base frame. The guide 30 can also be configured as part of the lateral cover 26. Since the guide 30 is arranged on an end region remote from the pick-up region 28, objects 10 can be removed in a simple manner if the pick-up region 28 of the carrier 12 is configured in the manner of a rake. The guide 30 is in this respect not in the way on the removal of the objects 10.

Figure 4:
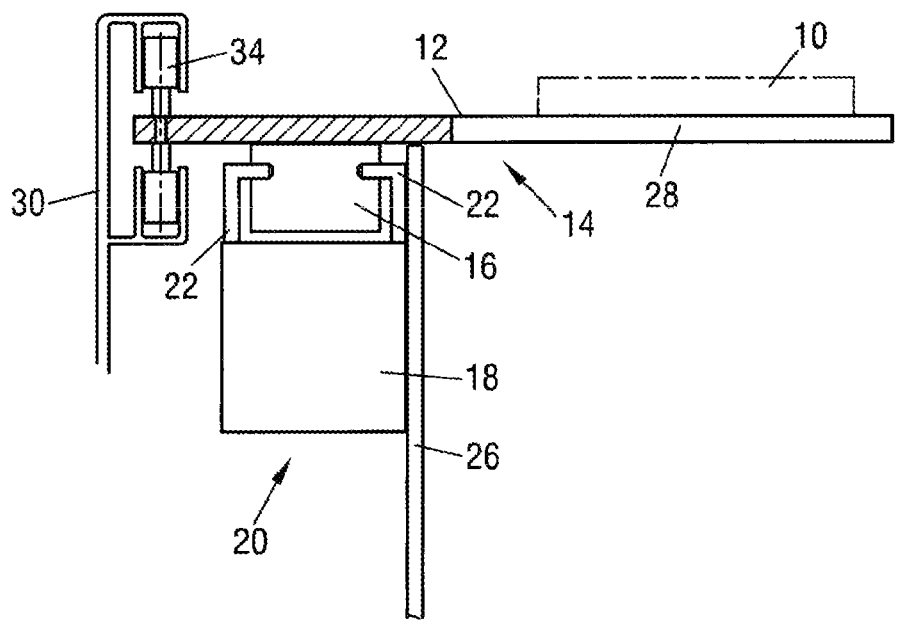

The same applies to the embodiment variant shown in FIG. 4. The guide 30 is in this respect also arranged at an end region remote from the pick-up region 28. The guide 30 is arranged laterally and can receive the carrier 12 between rolling means 34, for example. A sliding support can also be provided instead of the rolling support 34. Two rollers, balls or cones, or also only one thereof—that is generally one or more rolling elements—can be provided as the guide 30. The guide 30 can be rigidly fixed, e.g. to a base frame and can, for example, form a part of the lateral cover 26.

A possible extent of the path system 20 is shown in FIG. 5. Objects 10 can be transferred to the transport mover 14 from a feeder 38. However, product residues 40 or incorrect, e.g. underweight, portions can also in particular arise on the slicing of food products. It should, however, be avoided in this respect that these product residues 40 move onto the path system 20 and contaminate it. For this reason, the path system 20 can be led laterally next to the region of the feeder 38. Product residues 40 are thus conveyed and led off in the conveying direction F by the feeder 38, and indeed next to a region of the path system 20. If, in contrast, objects 10, e.g. portions of foods, are located on the feeder 38, a transport mover 14 can be traveled in the transport direction T into the region of the feeder 38. Since the transport mover 14 has a protruding pick-up region 28, the object 10 can be transferred to the carrier 12.

A combination of horizontal and vertical path systems 20 is shown in FIGS. 6 and 7. Transport movers 14 coming from a slicing apparatus, for example, are transferred on the horizontal path system 20 to the vertical path system 20. The vertical path system 20 has a plurality of tracks arranged above one another. The transport movers 14 can in this respect in particular be buffered. The transport movers 14 can finally again be transferred to a horizontal path system 20 at the left side. A combination of horizontal and vertical path systems 20 each having laterally protruding carriers 12 is in particular advantageous to be able to compensate different cycles or working speeds of a slicing apparatus, on the one hand, and of a packaging machine or of a robot, e.g. of a so-called picker, on the other hand. The electrotechnical region can in particular be separated with the aid of the cover 26 from the protruding pick-up region 28 of the carriers 12 in the region of the vertical path system 20.

As is shown in FIG. 7, the objects 10 can be combed off the carrier 12, in particular from the pick-up region 28, on the transition between a horizontal and a vertical path system 20. Only the objects 10 and not the total transport movers 14 can thus also be transferred.

In the embodiment variants that are shown in FIGS. 8 to 17, the carrier 12 comprises at least two pick-up regions 28.

As is shown in FIGS. 8 and 9, objects 10 are arranged on both pick-up regions 28. A counterweight balance is thus automatically present. An additional counterweight 36 is thus not required. The working region with the objects 10 is also arranged outside the path system 20 in this embodiment. Both pick-up regions 28 can in particular each be formed as continuous surfaces. It is also conceivable that at least one of the pick-up regions, preferably both pick-up regions 28, is/are configured in the manner of a rake as shown in the right hand variant. A cover 26 that shields the path system 20 from contamination can also be provided at the carrier 12. The cover 26 can, for example, be configured as rigid, as shown in the left hand variant. This is in particular conceivable in a path system 20 that is configured as a circular path. It is alternatively possible that the cover 26 is configured as flexible, e.g. as a fin or the like, as shown in the right hand variant. The cover 26 can also be supported in a rotatable or articulated manner in order, for example, also to be able to pass through points. Path systems 20 of a complex design having branching path sections can consequently also be traveled through.

The balanced carriers 12 protruding at both sides is comparatively heavy in comparison with the objects 10 to be transported, i.e. with the payload. No effects on the handling are therefore to be expected when the payload on both sides differs with respect to the weight or when only one side carries a payload, e.g. portions.

Figure 11:
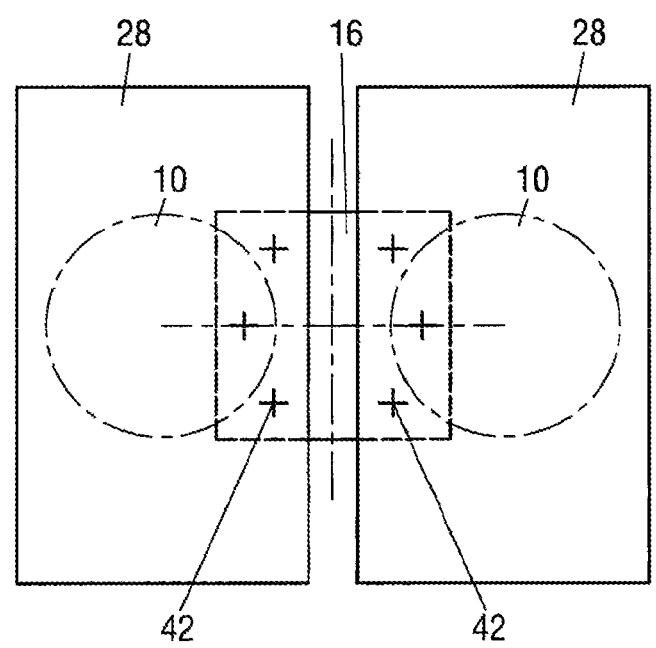

As is shown in FIGS. 9 to 11, a vertical adjustment device 42 for the pick-up regions 28 can also be provided. The pick-up regions 28 can in this respect in particular be individually adjusted vertically. This e.g. enables a separate raising for a gripping of portions taking place consecutively. This generally also enables the accessibility to the portions, for example also for scraping off. It can furthermore be avoided that adjacent portions are damaged. A compact design is in particular made possible that only protrudes a comparatively little.

The lift for the vertical adjustment device 42 can take place by influences or by a force from outside, preferably with the help of a run-on slope or by means of a mechanical, pneumatic, hydraulic or also technical magnetic device.

As is shown in FIG. 10, a pick-up region 28 of the carrier 12 can be raised in the lift direction H with the aid of the vertical adjustment device 42. A robot gripper 44 can remove the object 10 from the carrier 12 in this position.

Figure 12:
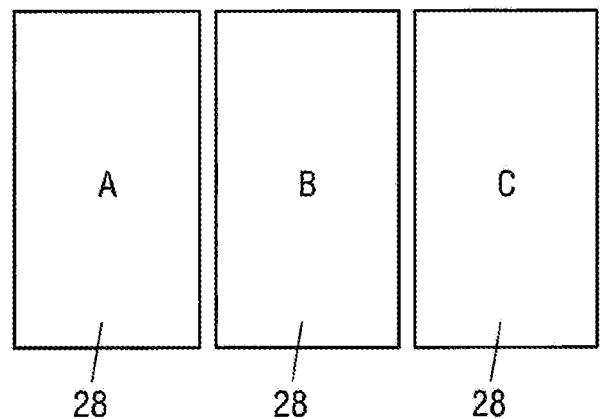

If, as shown in FIG. 12, the carrier is subdivided into three carrier sections A, B, C, the outer parts A and C are first raised and emptied. The objects 10 can subsequently be gripped from the carrier section B that is in a non-raised low position relative to the carrier sections A and/or C.

Figure 13:
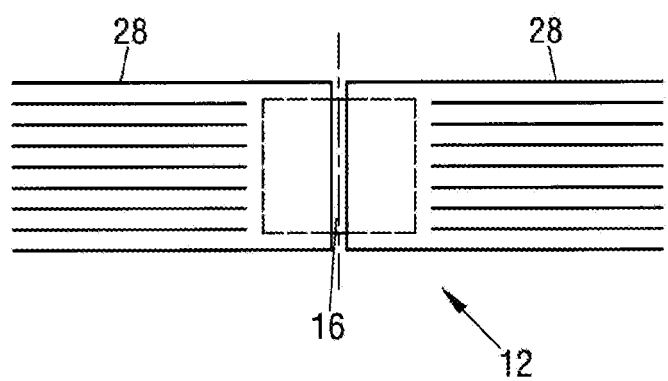
Figure 14:
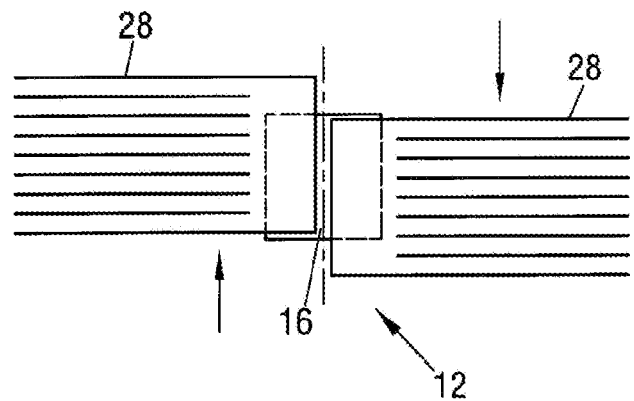

A double carrier, i.e. a carrier 12 having two pick-up regions 28, is shown in FIGS. 13 and 14. The pick-up regions 28 are configured in the manner of rakes in this respect.

As is shown in FIG. 14, the pick-up regions 28 can be displaced relative to one another from the outside. In this manner, objects 10 located thereon can above all be placed down individually on each side.

The displacement can take place by a force effect from the outside, e.g. by means of a fixed point at the margin of the path system 20 as an abutment for the carrier 12. The transport mover 14 can, for example, be brought into a specific position of the path system 20 with reference to the portion center of an object 10 on a pick-up region 28. The second pick-up region 28 can thereupon be displaced corresponding to the portion center of the object 10 located thereon in order also to achieve an ideal transfer point for this object 10.

A return apparatus, for example a spring-loaded return apparatus, can also be provided to again return the pick-up regions 28 into a non-displaced position.

The pick-up regions 28 can also be flipped open. This is shown in FIGS. 15 to 17. Objects 10 can thus be transferred downwardly. This is in particular advantageous for portions or for portions to be transferred to packagings, e.g. to so-called trays. Flaps provided for this purpose, for example, can in particular be actuated from the outside, e.g. by means of levers, racks, bolts, a pneumatic system or the like. The flaps can in particular again be returned into the normal position, i.e. into the transport position. A return spring can, for example, be provided in this respect. The flaps can be fixed in the normal position. The release of these fixed connections can take place from the outside.

To fix the flaps, a latch 46, e.g. in the manner of a tab, can, for example, be provided, as is shown in FIG. 17.

In an embodiment having two coupled transport movers 14, the latching of the flaps can e.g. take place by a tab or by bolts. They can be actuated from the outside, for example. Alternatively, they can also be actuated by a moving together of the transport movers 14 or the folding movement can be controlled by a correspondingly coordinated traveling of the transport movers 14. A clearance in the common carrier 12 is in particular provided in the longitudinal direction for the moving together or for the traveling of the transport movers 14.

A respective stabilization apparatus 48 is provided in the embodiments shown in FIGS. 18 to 20. The carrier 12 normally has a certain clearance relative to the runner 16 of the transport mover 14. This clearance can in particular result in unwanted movements such as a "wobbling" if, for example, objects 10 are to be removed from the carrier 12.

In FIG. 18, the stabilization apparatus 48 comprises a ramp 50 as the support element. The ramp 50 is placed onto the path system 20 or forms a part of the path system 20. Once the transport mover 14 reaches the region of the ramp 50, the carrier 12 lies on the ramp 50 and can no longer move relative to the runner 16. Such a stabilization is in particular advantageous in the region of the transfer to a packaging apparatus in the region of the portion pick-up or in corner regions.

While the stabilization apparatus 48 is formed statically in FIG. 18, it can also be active, as shown by way of example in FIG. 19.

In accordance with FIG. 19, the stabilization apparatus 48 comprises a conveyor belt 52. This is also elevated with respect to the remaining path system 20 so that the carrier 12 can lie thereon. The transport mover 14 an thus also be moved, at least in an assisting manner, by the conveyor belt 52 in the region of the stabilization apparatus 42. The transport mover 14 is optionally also moved at the speed of the conveyor belt 52.

In accordance with the embodiment shown in FIG. 20, the stabilization apparatus 48 does not necessarily have to be connected to the path system 20. It is thus also possible that the stabilization apparatus 48 is arranged at the transport mover 14, in particular at the lower side of the carrier 12. The carrier 12 thus has rollers 54 that can support the carrier 12 on the path system 20 so that there is no longer any clearance present between the carrier 12 and the runner 16 of the transport mover 14.

An embodiment having a rotatably supported carrier 12 of a transport mover 14 is shown in FIG. 21. Although two protruding pick-up regions 28 are shown here, the following embodiments also apply accordingly to a carrier 12, e.g. a square carrier, without a protrusion.

The carrier 12 can be rotated about an axis of rotation D relative to the runner 16. The axis of rotation D in this respect extends centrally through the transport mover 14, with generally an asymmetrically or eccentrically arranged axis of rotation generally also being possible.

The carrier 12 is guided by a guide 30 for the carrier 12. The guide 30 can be arranged at one side, at both sides or at alternate sides with respect to the path system 20. The guide 30 can also only be provided in part regions or can even be omitted entirely.

The guide 30 forms a horizontal holder or support surface for the carrier 12, in particular for its marginal region. The guide 30 can in particular be configured as a bracket having a holder for a marginal region of the carrier 12.

A canting of the carrier 12 is in particular prevented with the aid of four rolling means 34, e.g. support rollers, that are arranged at the corner regions of the carrier 12. Alternatively, the guide 30 can comprise a sliding guide or a roller guide. A plastic section of the carrier 12 can also e.g. slide on a metal guide 30 that is preferably formed as a separate portion attached to the path system 20 or to a lower frame. The guide 30 for the carrier 12 can in particular also be a component of an areal path cover.

A slotted guide can also be considered as a guide 30 for the carrier 12 and corresponds at least on part lines from below to the carrier 12, that is in particular does not engage into its marginal region. A pin at the lower side of the carrier 12 can therefore, for example, be guided in the slotted guide. If the slotted guide has a corresponding path extent, the pin effects a rotation or movement of the carrier 12. The slotted guide is thus located in the region between the margin of a carrier 12 and the margin of the path 20.

It is also possible, at least on part pieces of the path 20, that at least on pin, preferably at least two pins, directed downwardly at the carrier 12 corresponds/correspond to at least one guide 22 for the runner 16. Said pin preferably contacts the guide 22 from the outside and prevents a rotation of the carrier 12. The guide 22 for the runner 16 in this respect forms at least a part of the guide 30 for the carrier 12.

A different design of the guide 30 can be provided for the carrier 12 in the corner regions, with a corresponding pin in particular being able to be countersunk or folded away. The carrier can in this respect be guided by other means.

A spring preload can be provided in the pivot joint for the carrier 12 in the transport mover 14 and predefines or ensures a specific orientation or alignment of the carrier 12. An additional guide 30 for the carrier 12 can thereby in particular be replaced at least in part. A corresponding spring element or locking element can in this respect in particular be configured as releasable to e.g. execute a rotation.

To rotate the carrier 12 on the travel path, the side guide 30 for the carrier 12 can be offset outwardly or saved at the corresponding point. The guide 30 can in particular be adjustable in a switchable manner. This is shown at the left side in FIG. 21. At least rotational apparatus, formed e.g. as a cam 56 here, is moved into the travel region and cooperates with the carrier 12 such that the carrier 12 rotated when moving past.

Two transport movers 14 that each have a laterally protruding pick-up region 28 for objects 10 to be transported and that are associated with another are shown in the path system 20 in FIG. 22. The carriers of these two movers 14 providing these pick-up regions 28 are each substantially L-shaped and are configured in mirror-inverted form in this embodiment. In this manner, a free space is also present in the region of the path system 20 comprising the guides 22 between the movers 14 when the protruding pick-up regions 28 of the two carriers provide, in accordance with the situation in FIG. 22, a contiguous total holding surface or a total holding surface for the objects 10 at most interrupted by a small gap.

To place down the objects 10—by dropping them in this embodiment—the two movers 14 are moved away from one another in opposite directions, as is indicated by the two arrows in FIG. 22.

The embodiment shown in FIG. 23 corresponds to that of FIG. 22, with each mover 14 additionally being provided with a placement aid 58 configured as a scraper or as a scooper. The scrapers 58 are each fastened to the one mover 14 and extend toward the pick-up region 28 of the other mover 14 so that they can cooperate on the moving apart of the two movers 14 with the objects 10 in a respective desired manner dependent inter alia on the design of the scrapers 58.

The scrapers 58 can each be rigid and can be at least substantially adapted with their outreach to the travel path of the two movers 14. Alternatively or additionally, the scraper 58 extending toward a pick-up region 28 can move along with said pick-up region 28 when the two movers 14 are moved away from one another.

The scrapers 58 can be elastically deflectable to be able to yield on a moving apart of the movers 14, e.g. when they come into contact with the objects 10 and the objects 10 then only lie on the pick-up region or regions 28 in part.

The design and arrangement of the scrapers 58 also depends on the property of the respective objects 10, for example on whether they are comparatively solid "packaged material" or soft objects. It is also possible to comb off the pick-up regions 28 by means of the scrapers 58 in each case. The scrapers 58 can generally cooperate with the objects 10 in any desired vertical position.

It is also possible, for example, to use blade-like or wire-like scrapers 58 that are moved between the lower side of the objects 10 and the holding surface of the pick-up regions 28 when the movers 14 are moved apart in order to separate or release the objects 10 from the holding surfaces in this manner such that the pick-up regions 28 can be moved away better beneath the objects 10.

Alternatively or in addition to scrapers 58 moved along with the movers 14, a fixing device can be provided in the movement direction of the movers 14 that is stationary relative thereto and that e.g. has a frame-like design and can be lowered in the region of the respective placement position of the objects 10 onto an object respectively lying on the common support region of the two movers 14 and that engages around or over this object. A fixing frame can in this respect be placed around the object, for example. The object 10 is hereby itself held tight on the moving apart of the movers 14 at least in the movement direction of the movers 14 when said object adheres to the pick-up regions 28 of the movers 14. It is ensured in this manner that objects 10 to be placed down by dropping remain at the respective predefined placement position when the movers 14 are moved part to generate a "placement opening".

The moving apart of the movers 14 preferably generally takes place simultaneously to the extent that the two movers 14 are each moved in opposite directions at the same speed and over the same route line.

The arrangement of the carrier relative to the runner or to the stator can thus generally be improved in a simple manner by the invention.

REFERENCE NUMERAL LIST 10 object
12 carrier
14 transport mover
16 runner
18 stator
20 path system
22 guide for runners
24 electrotechnical unit
26 cover
28 pick-up region
30 guide for carriers
32 holding apparatus
34 rolling means
36 counterweight
38 feeder
40 product residue
42 vertical adjustment device
44 robot gripper
46 latch
48 stabilization apparatus
50 ramp, support element
52 conveyor belt
54 roller
56 cam, rotational apparatus
58 placement aid, scraper, peeler
F conveying direction
T transport direction
H lift direction
A, B, C carrier section
D axis of rotation

The invention claimed is:

1. An apparatus for moving objects, the apparatus comprising
 a plurality of individually movable transport movers for the transport of the objects;
 a path system for the transport movers in which the transport movers are movable in a transport direction along at least one predefined path; and
 a control device for controlling the movements of the transport movers in the path system,
 the transport movers each comprising at least one runner cooperating with the path system and at least one carrier for objects attached to the runner;
 the carrier at least temporarily located in a protruding position in which the carrier protrudes laterally at least with a pick-up region for the objects; and
 the pick-up region arranged in the protruding direction laterally offset from at least one of a stator of the path system, the runner and a guide for the runner, the carrier removable from the runner, the removed carrier at least temporarily conveyable by a drive provided in addition to the path system.

2. The apparatus in accordance with claim 1, wherein the carrier is permanently located in the protruding position.

3. The apparatus in accordance with claim 1, wherein the carrier is at least temporarily rotatably supported relative to the runner.

4. The apparatus in accordance with claim 1, wherein the carrier is adjustable into the protruding position from a normal position in which the carrier is arranged at least substantially centrally above at least one of the stator of the path system and the runner.

5. The apparatus in accordance with claim 1, further comprising at least one guide for the carrier at least sectionwise.

6. The apparatus in accordance with claim 5, wherein the at least one guide for the carrier differs from the guide for the runner.

7. The apparatus in accordance with claim 5, wherein the at least one guide for the carrier cooperates with a laterally protruding region of the carrier.

8. The apparatus in accordance with claim 5, wherein the carrier comprises a holding apparatus that cooperates with the at least one guide and/or lies on or contacts the at least one guide.

9. The apparatus in accordance with claim 8, wherein the holding apparatus comprises at least one of a rolling means and a sliding section having a friction-reducing material.

10. The apparatus in accordance with claim 1, wherein the additional drive takes over the guidance on a corresponding section of the path.

11. An apparatus for moving objects, the apparatus comprising
a plurality of individually movable transport movers for the transport of the objects;
a path system for the transport movers in which the transport movers are movable in a transport direction along at least one predefined path; and
a control device for controlling the movements of the transport movers in the path system,
the transport movers each comprising at least one runner cooperating with the path system and at least one carrier for objects attached to the runner;
the carrier at least temporarily located in a protruding position in which the carrier protrudes laterally at least with a pick-up region for the objects; and
the pick-up region arranged in the protruding direction laterally offset from at least one of a stator of the path system, the runner and a guide for the runner, the transport mover provided with a counterweight for balancing the pick-up region.

12. The apparatus in accordance with claim 11, wherein the counterweight is attached to one of the carrier, a holder and a crossbeam for the carrier.

13. The apparatus in accordance with claim 11, wherein the counterweight is variable for adapting to a weight to be balanced.

14. An apparatus for moving objects, the apparatus comprising
a plurality of individually movable transport movers for the transport of the objects;
a path system for the transport movers in which the transport movers are movable in a transport direction along at least one predefined path; and
a control device for controlling the movements of the transport movers in the path system,
the transport movers each comprising at least one runner cooperating with the path system and at least one carrier for objects attached to the runner;
the carrier at least temporarily located in a protruding position in which the carrier protrudes laterally at least with a pick-up region for the objects; and
the pick-up region arranged in the protruding direction laterally offset from at least one of a stator of the path system, the runner and a guide for the runner, at least one pair of cooperating transport movers provided that form, together with their pick-up regions, a common, laterally protruding pick-up region for the objects.

15. The apparatus in accordance with claim 14, wherein the two transport movers are movable relative to one another for the placement of objects such that the pick-up regions are movable away beneath the objects.

16. The apparatus in accordance with claim 14, wherein at least one of the pick-up regions of the two transport movers is movable relative to a placement aid cooperating with the objects on the placement.

17. The apparatus in accordance with claim 16, wherein the placement aid is configured as one of a scraper and a fixer.

18. An apparatus for moving objects, the apparatus comprising
a plurality of individually movable transport movers for the transport of the objects;
a path system for the transport movers in which the transport movers are movable in a transport direction along at least one predefined path; and
a control device for controlling the movements of the transport movers in the path system,
the transport movers each comprising at least one runner cooperating with the path system and at least one carrier for objects attached to the runner;
the carrier at least temporarily located in a protruding position in which the carrier protrudes laterally at least with a pick-up region for the objects; and
the pick-up region arranged in the protruding direction laterally offset from at least one of a stator of the path system, the runner and a guide for the runner, at least one support provided that is at least regionally elastically deformable in at least one transport mover between the carrier and the runner.

19. An apparatus for moving objects, the apparatus comprising
a plurality of individually movable transport movers for the transport of the objects;
a path system for the transport movers in which the transport movers are movable in a transport direction along at least one predefined path; and
a control device for controlling the movements of the transport movers in the path system, wherein the transport movers each comprise at least one runner cooperating with the path system and at least one carrier for objects attached to the runner; and
wherein a stabilization apparatus is provided that at least temporarily restricts a movability of the carrier relative to the runner, wherein at least one of the carrier and the transport mover can be raised by means of the stabilization apparatus.

20. The apparatus in accordance with claim 19, wherein the stabilization apparatus is active along the total path or in at least a part region of the path.

21. The apparatus in accordance with claim 19, wherein the stabilization apparatus is arranged at the path.

22. The apparatus in accordance with claim 19, wherein the stabilization apparatus comprises at least one support element for the carrier.

23. The apparatus in accordance with claim 22, wherein the at least one support element is able to be brought into engagement with a lower side of the carrier.

24. The apparatus in accordance claim 19, wherein the stabilization apparatus is active or passive.

* * * * *